No. 855,303. PATENTED MAY 28, 1907.
P. H. GRAVES.
WHEEL SPINDLE.
APPLICATION FILED AUG. 11, 1906.
2 SHEETS—SHEET 2.
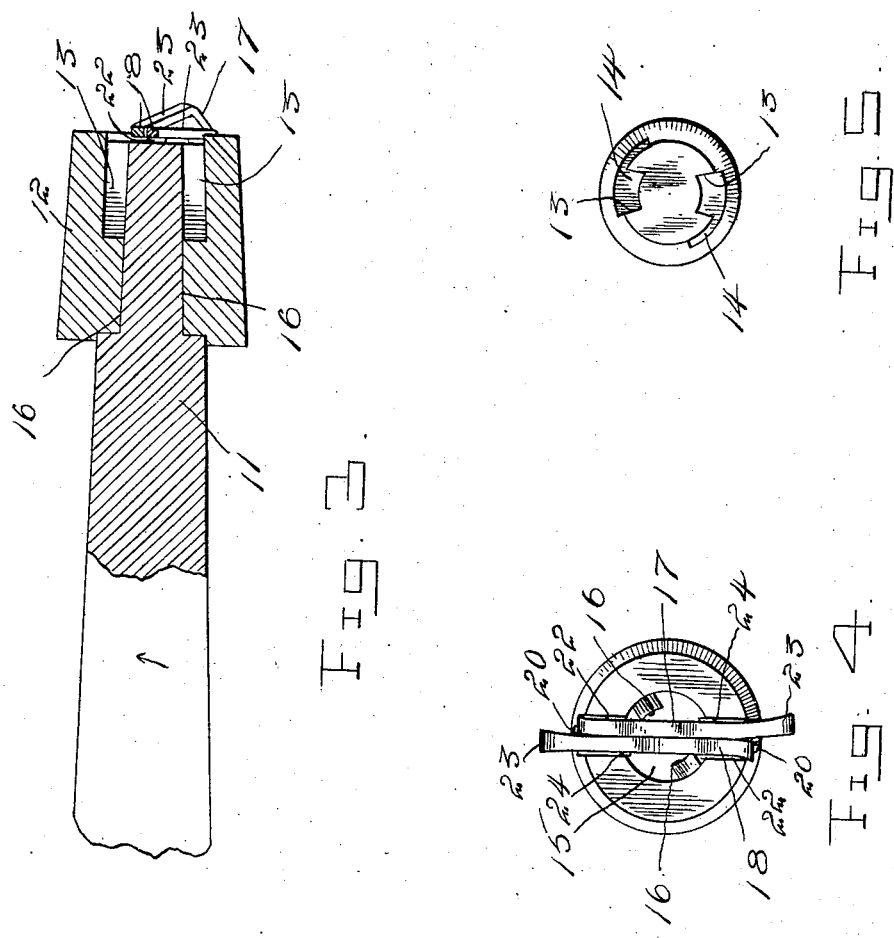

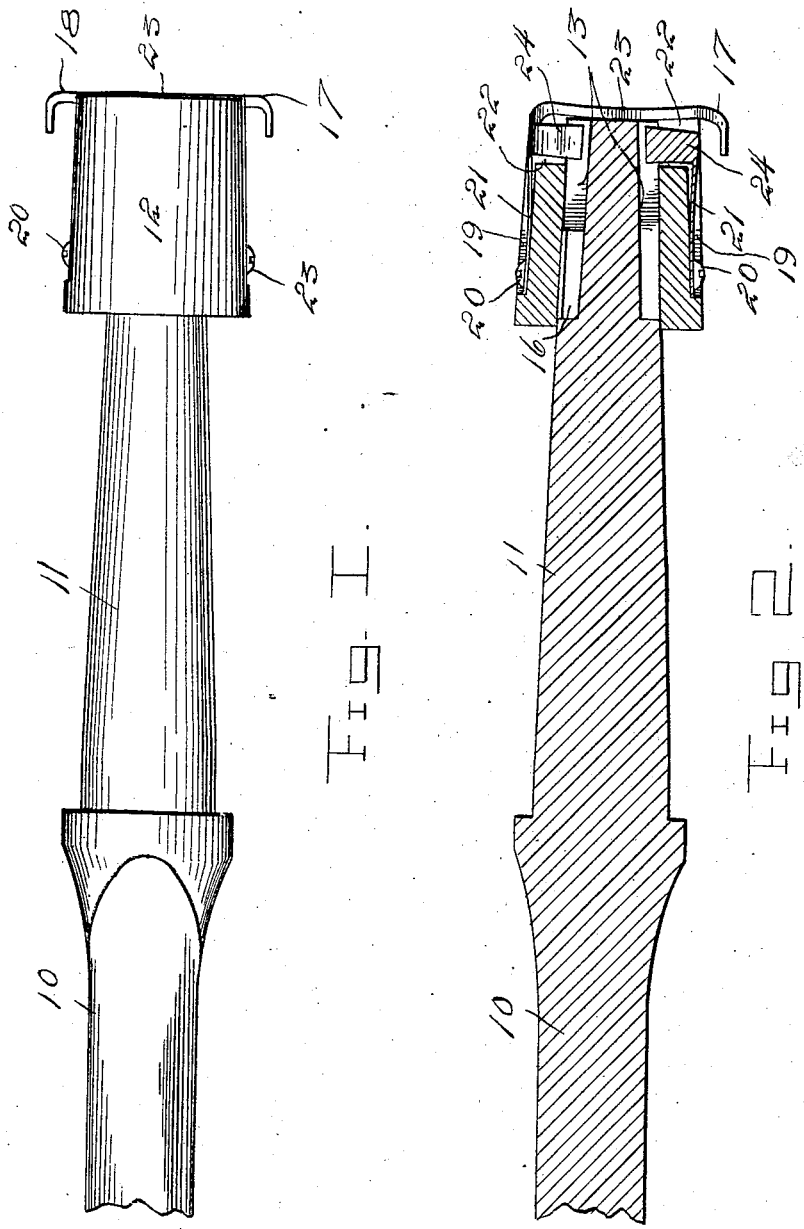

UNITED STATES PATENT OFFICE.

PATRICK H. GRAVES, OF SHARPS CHAPEL, TENNESSEE.

WHEEL-SPINDLE.

No. 855,303.  Specification of Letters Patent.  Patented May 28, 1907.

Application filed August 11, 1906. Serial No. 330,180.

*To all whom it may concern:*

Be it known that I, PATRICK H. GRAVES, a citizen of the United States, residing at Sharps Chapel, in the county of Union, State of Tennessee, have invented certain new and useful Improvements in Wheel-Spindles; and I do hereby declare the following to be a full, clear, and exact description of the invention, such as will enable others skilled in the art to which it appertains to make and use the same.

This invention has relation to vehicle spindles and nuts for securing wheels thereon.

The invention has as its objects the provision of means whereby the nut may be taken off and replaced with the greatest celerity, and when in position on the spindle the nut will operate to hold the wheel thereon with the utmost certainty.

The invention may be embodied in the device clearly illustrated in the annexed drawings, forming a part of this specification, in view of which drawings the invention will first be described in detail with respect to its construction and mode of operation, and then be pointed out in the subjoined claims.

Of the said drawings:—Figure 1 is an elevational view. Fig. 2 is a vertical longitudinal section. Fig. 3 is a longitudinal section showing the nut on the spindle but before being turned to lock it in position. Fig. 4 is an end view. Fig. 5 is an end view of the spindle.

Similar numerals of reference designate similar parts or features, as the case may be, wherever they occur.

In the drawings, 10 designates the vehicle axle and 11 its spindle on which the wheel (not shown) turns.

12 is the nut on the end of the spindle for holding the wheel on the same.

Instead of threading the spindle and nut and turning the latter on the former, for the sake of security and certainty in maintaining the nut on the spindle and in order to take the nut off and replace it with expedition, I affix the nut on the spindle by a so-called "bayonet connection" and lock it in place with springs, the manipulation of the parts being easy and ready, and in some particulars the operation is automatic.

The end of the spindle is provided on opposite sides with a relatively narrow longitudinal groove 13, that, at its inner end, opens into a groove 14 of twice the width of the narrower groove. The bore 15 of the nut 12 is provided on opposite sides with tongues 16 that are in the grooves 13 of the spindle and are of such a length that, in putting the nut on the spindle with the tongues 16 in the grooves 13 and pushing the nut on as far as the tongues will allow it to go, and then turning the said nut in the direction indicated by the arrow marked on the spindle, the said tongues will pass laterally into the enlarged or offset part of the groove 14, locking the nut on the spindle by a bayonet joint or connection, as beforesaid.

17 and 18 designate locking springs, one being a counterpart of the other in respect to form. Each spring consists of a broadened base 19 perforated to receive a fastening screw 20 and a shank 21, said base and shank being set in the side of the nut. At the point where the shank reaches the end of the nut the spring is bent at a right angle across the said end which is notched as at 22, so that the said angular part may set in flush with the nut, and the extreme end of each spring, which extends beyond the side of the end of the nut, is bent inward at a right angle, forming a rib 23 to facilitate the manipulation of the springs. In crossing the end of the nut, the angular part of one spring lies along the side of the other, the notch 22 being wide enough to receive both therein and the spindle 11 not extending out far enough to interfere with the arrangement described.

Each spring 17 and 18 is provided just below its angular bend, and at the end of the spindle, with a lug 24 that rests partly in the bottom of the notch 22, its inner end extending into the outer end of the groove 13 when the nut is fully in position on the spindle. Under this construction it will be seen that the nut will be held and locked on the spindle so as to hold the wheel thereon with security whether said wheel be turned backward or forward.

The only way to remove the nut is by taking hold of the ribs of the springs and by raising the angular parts extending across the end of the spindle and pressing the ends toward each other, the lugs 24 will be disengaged from the notches 22 when the nut may be given a slight turn backward in a direction opposite to the flight of the arrow marked on the spindle and the nut may be pulled forward off.

The bayonet lock or connection of the nut with the spindle holds the vehicle wheel on said spindle, and the springs operate to lock the nut in its place.

It is recognized that changes may be made in the form and arrangement of parts and features of the invention without departing from the nature or spirit thereof.

What is claimed as the invention, is:—

1. The combination with the spindle provided with grooves, of the nut having a central bore adapting it to be secured on the spindle, notches in the end of the said nut, springs connected with the sides of the nut and having means extending through the notches in the end of the nut and into the grooves in the spindle, said springs being also provided with angular extensions disposed side by side across the end of the nut.

2. The combination with the spindle provided with grooves, of the nut having a central bore adapting it to be secured on the spindle, notches in the end of the said nut, springs secured to the nut and having lugs projecting through the said notches into the grooves in the spindle, the springs having angular extensions and angular ribs on the extreme end of the extensions.

In testimony whereof, I affix my signature, in presence of two witnesses.

PATRICK H. GRAVES.

Witnesses:
C. A. BROWNING,
B. J. BROWNING.